United States Patent
Skorczewski

(10) Patent No.: US 12,013,216 B2
(45) Date of Patent: Jun. 18, 2024

(54) LASER CONTROLLER WITH LIGHT PATH CHARACTERIZATION BY BACKSCATTER DETECTION

(71) Applicant: BAE Systems plc, London (GB)

(72) Inventor: Leon Paul Skorczewski, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/799,045

(22) PCT Filed: Feb. 10, 2021

(86) PCT No.: PCT/GB2021/050302
§ 371 (c)(1),
(2) Date: Aug. 11, 2022

(87) PCT Pub. No.: WO2021/165645
PCT Pub. Date: Aug. 26, 2021

(65) Prior Publication Data
US 2023/0062666 A1    Mar. 2, 2023

(30) Foreign Application Priority Data

Feb. 17, 2020  (EP) ..................................... 20275043
Feb. 17, 2020  (GB) .................................. 2002136.6

(51) Int. Cl.
*F41H 13/00*   (2006.01)
*H01S 3/13*    (2006.01)

(52) U.S. Cl.
CPC ......... *F41H 13/005* (2013.01); *H01S 3/1304* (2013.01); *H01S 3/1305* (2013.01)

(58) Field of Classification Search
CPC .. F41H 13/005; F41H 13/0062; H01S 3/1304; H01S 3/1305; F41A 33/02; F41A 17/063; F41G 3/2655; F41G 3/2683; F41G 3/32
See application file for complete search history.

(56) References Cited

U.S. PATENT DOCUMENTS

| | | | |
|---|---|---|---|
| 4,657,382 A * | 4/1987 | Busujima ................ | G01S 17/87 356/5.08 |
| 10,197,677 B1 | 2/2019 | Crawford | |
| 2010/0171944 A1* | 7/2010 | Langdon ................... | G01P 5/26 356/28.5 |
| 2011/0103410 A1 | 5/2011 | Hutchin | |

(Continued)

FOREIGN PATENT DOCUMENTS

| EP | B608231 A1 | 2/2020 |
|---|---|---|
| WO | 2008133648 A | 11/2008 |
| WO | 2009034370 A1 | 3/2009 |

OTHER PUBLICATIONS

International Preliminary Report on Patentability for PCT Appl. No. PCT/GB2021/050302 mail date Sep. 1, 2022, 8 pages.

(Continued)

*Primary Examiner* — Jennifer D Bennett
(74) *Attorney, Agent, or Firm* — Maine Cernota & Curran

(57) ABSTRACT

A laser controller with backscatter detection includes an electromagnetic radiation source operable to transmit radiation into the environment, a backscatter detector operable to detect backscattered radiation from the environment, and a processor operable to generate a laser control signal based on characteristics of the detected backscattered radiation.

13 Claims, 3 Drawing Sheets

(56) References Cited

U.S. PATENT DOCUMENTS

2012/0292481 A1 11/2012 Hutchin
2014/0125964 A1 5/2014 Jonas
2018/0003824 A1 1/2018 Volfson

OTHER PUBLICATIONS

European Search Report for European Patent Appl. 20275043.6-1011 mail date Aug. 7, 2020, 9 pages.
Great Britain Search Report for GB Patent Appl. No. GB2002136.6 mail date Jul. 23, 2020, 5 pages.
International Search Report for PCT Appl. PCT/GB2021/050302 mail date Apr. 8, 2021, 13 pages.

\* cited by examiner

LASER CONTROLLER WITH LIGHT PATH CHARACTERIZATION BY BACKSCATTER DETECTION

RELATED APPLICATIONS

This application is a national phase application filed under 35 USC § 371 of PCT Application No. PCT/GB2021/050302 with an international filing date of Feb. 10, 2021, which claims priority of GB Patent Application 2002136.6 filed Feb. 17, 2020 and European patent application 20275043.6 filed Feb. 17, 2020. All of these applications are incorporated herein by reference in their entirety for all purposes.

TECHNICAL FIELD

This disclosure relates to laser controllers, vehicles incorporating laser controllers, and to methods of controlling a laser.

BACKGROUND

Lasers are able to deliver concentrated light energy over significant distances when there is no contamination in the light path. However, atmospheric distortions and contamination such as differing turbulence states, particulates such as dust or high humidity such as clouds in the light path will to varying degrees reflect, absorb and scatter light incident thereon, meaning that the delivered intensity is reduced. Even small amounts of contamination in the light path can significantly reduce the amount of energy delivered to a target, particularly when the contamination is located close the laser source.

Reduction of delivered intensity caused by contamination or atmospheric distortions in the light path is a problem for laser directed energy weapons (LDEWs). These problems may be serious at ground level and at sea, with factors such as salt spray or dusty desert environments exacerbating the issues. Different atmospheric effects at different times or on different days, such weather or pollen count, can affect fixed installations. Vehicle-mounted LDEWs may encounter varying environmental conditions as they move, for example if flying in and out of clouds. Furthermore, vehicle-mounted LDEWs often have operational limitations, for example a maximum operation duration or a minimum time between operations, owing to the constraints made to enable the LDEW to be small and light enough to be mobile, or otherwise integrated in to the power generation and thermal management systems of a vehicle. This means that there are often additional constraints to consider when controlling the laser of LDEWs, and in particular vehicle-mounted LDEWs.

Therefore, there is a need for a suitable laser controller to control when and how to operate a laser according to environmental conditions that may affect the light path.

SUMMARY

In one aspect there is provided a laser controller comprising:
an electromagnetic radiation source operable to transmit radiation into the environment;
a backscatter detector operable to detect backscattered radiation from the environment; and
a processor operable to generate a laser control signal based on characteristics of the detected backscattered radiation.

In one example, the backscatter detector is operable to detect backscattered radiation resulting from operation of the electromagnetic radiation source.

In one example, the backscatter detector is operable to detect backscattered radiation at a first distance range relative to the electromagnetic radiation source.

In one example, the backscatter detector and is operable to detect backscattered radiation within a plurality of different distance ranges relative to the electromagnetic radiation source.

In one example, the backscatter detector is operable to detect backscattered radiation within a plurality of distance ranges from the electromagnetic radiation source. In one example, the backscatter detector is operable to detect backscattered radiation within a plurality of distance ranges from the electromagnetic radiation source, starting with a first distance, and moving to one or more greater distances from the electromagnetic radiation source.

In one example, the processor is operable to generate a laser control signal based on characteristics of the detected backscattered radiation including intensity of the detected backscattered radiation.

In one example, the processor is operable to generate a laser control signal for selectively enabling and disabling operation of a laser controlled by the laser controller.

In one example, the processor is operable to generate a laser control signal for disabling operation of a laser controlled by the laser controller when the intensity of the detected backscattered radiation is above a cut-off threshold level.

In one example, the processor is operable to generate a laser control signal for enabling operation of a laser controlled by the laser controller when the intensity of the detected backscattered radiation is below a cut-off threshold level.

In one example, the processor is operable to generate a laser control signal for modulating the operational power of a laser controlled by the laser controller according to the intensity of the backscattered radiation. In one example, the processor is operable to generate a laser control signal for increasing the operation power of a laser controlled by the laser controller above a default power when the intensity of the backscattered radiation is between a first modulation threshold and a second modulation threshold.

In one example the second modulation threshold is below the cut-off threshold level.

In one example, the electromagnetic radiation source is operable to transmit ultra-violet radiation. In one example the electromagnetic radiation source is a laser. In one example, the electromagnetic radiation source is operable independently of a laser controlled by the laser control signal.

In one example, the backscatter detector comprises an interferometer.

In one example, the electromagnetic radiation source and backscatter detector comprise parts of a gas velocity sensor. In one example the gas velocity sensor comprises Doppler frequency shift sensor.

In one example, the laser controller is operable to control a laser of a LDEW using the laser control signal. In one example the laser controller is integral with a LDEW. In one example, the electromagnetic radiation source is operable to transmit radiation in a direction aligned with the laser of the LDEW. In one example, the radiation source is operable to transmit radiation along the same axis as the laser of the LDEW. In one example, the laser controller is integral with a LDEW, and arranged to operate the laser of the LDEW as the electromagnetic radiation source.

In another aspect there is provided a vehicle comprising a laser controller as set out herein. In one example the vehicle comprises an aircraft.

In another aspect there is provided a method of controlling a laser, the method comprising operating an electromagnetic radiation source to transmit radiation into the environment; operating a backscatter detector to detect backscattered radiation from the environment; and generating a laser control signal based on characteristics of the detected backscattered radiation.

In one example, the method is performed by a laser controller as set out herein. In one example, the method is performed in a vehicle as set out herein.

In one example, the method comprises operating the backscatter detector to detect backscattered radiation resulting from operation of the electromagnetic radiation source.

In one example, the method comprises operating the backscatter detector to detect backscattered radiation at a first distance range relative to the electromagnetic radiation source.

In one example, the method comprises operating the backscatter detector to detect backscattered radiation within a plurality of different distance ranges relative to the electromagnetic radiation source.

In one example, the method comprises operating the backscatter detector to detect backscattered radiation within a plurality of distance ranges from the electromagnetic radiation source. In one example, the method comprises operating the backscatter detector and to detect backscattered radiation within a plurality of distance ranges from the electromagnetic radiation source, starting with a first distance, and moving to one or more greater distances from the electromagnetic radiation source.

In one example, the method comprises generating a laser control signal based on characteristics of the detected backscattered radiation including intensity of the detected backscattered radiation.

In one example, the method comprises generating a laser control signal for selectively enabling and disabling operation of a laser controlled by the laser controller.

In one example, the method comprises generating a laser control signal for disabling operation of a laser controlled by the laser controller when the intensity of the detected backscattered radiation is above a cut-off threshold level.

In one example, the method comprises generating a laser control signal for enabling operation of a laser controlled by the laser controller when the intensity of the detected backscattered radiation is below a cut-off threshold level.

In one example, the method comprises generating a laser control signal for modulating the operational power of a laser controlled by the laser controller according to the intensity of the backscattered radiation. In one example, the method comprises generating a laser control signal for increasing the operation power of a laser controlled by the laser controller above a default power when the intensity of the backscattered radiation is between a first modulation threshold and a second modulation threshold.

In one example, the method comprises operating the electromagnetic radiation source independently of a laser controlled by the laser control signal.

In one example, the method comprises operating an electromagnetic radiation source and backscatter detector that comprise parts of a gas velocity sensor.

In one example, the method comprises controlling a laser of a LDEW using the laser control signal.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DESCRIPTION OF EXAMPLE EMBODIMENTS

Figure 1:
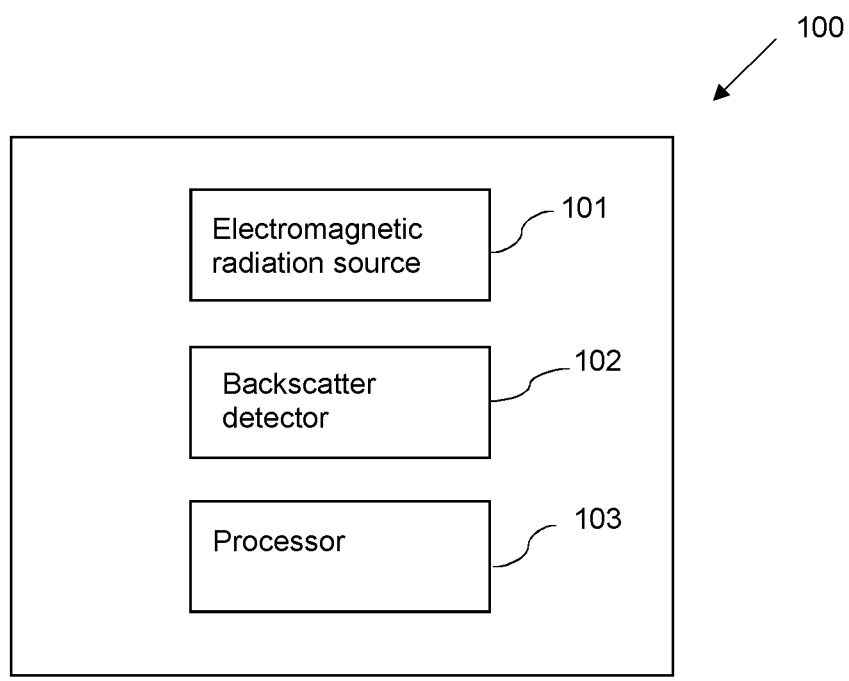
FIG. 1 is an illustration of a laser controller according to an example embodiment.

Referring now to FIG. 1, a laser controller is denoted as a whole by the reference numeral 100.

The laser controller 100 comprises an electromagnetic radiation source 101 operable to transmit radiation into an environment, a backscatter detector 102 operable to detect backscattered radiation from the environment, and a processor 103 operable to generate a laser control signal based on characteristics of the detected backscattered radiation. By detecting backscatter from the environment, the laser controller 100 can, using the processor 103, determine suitable operating parameters for a laser under its control. For example, if the laser controller 100 determines, based on a large amount of backscatter, that there is no clear light path from the laser to a target, then operation of the laser can be prevented. This avoids ineffective operation of the laser.

Figure 2:
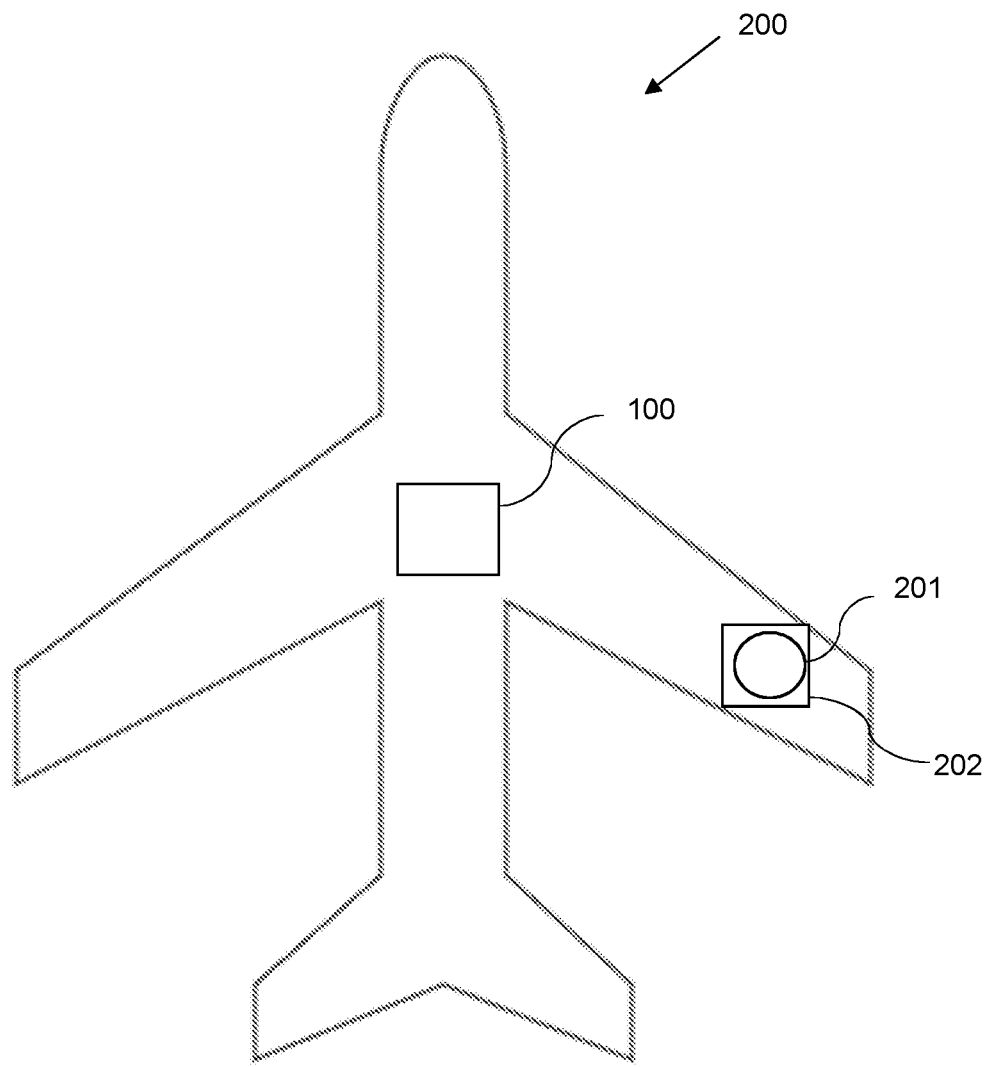
FIG. 2 is an illustration of a vehicle comprising a laser controller according to an example embodiment.

FIG. 2 shows a vehicle comprising the laser controller 100. In FIG. 2 the vehicle 200 comprising a laser controller 100 also comprises a laser 201. While the vehicle 200 is shown here as an aircraft, it would be readily appreciated that the present invention is applicable to other types of vehicles such as ships, land vehicles and so on.

The laser 201 is part of a laser-directed energy weapon 202 (LDEW), and the laser controller 100 is operable to control the laser 201 of the LDEW 202 using the laser control signal. Although here depicted as two separate components the laser controller 100 may be integral with the LDEW 202.

The backscatter detector 102 and electromagnetic radiation source 101 comprise parts of a gas velocity sensor that are part of the vehicle 200. The gas velocity sensor comprises a Doppler frequency shift sensor, such as that described in patent publication WO 2009/034370 A1, filed in the name of the present applicant, the contents of which are incorporated herein by reference. The gas velocity sensor is primarily used to determine airspeed of the vehicle, but includes an ultra violet laser source and an interferometer that can also be advantageously used as the electromagnetic radiation source 101 and backscatter detector 102 of the laser controller 100 respectively.

The backscatter detector 102 in use detects backscattered radiation at a first distance range relative to the electromagnetic radiation source 101. The backscatter detector 102, and electromagnetic radiation source 101 are operable together to detect backscattered radiation within a plurality of different distance ranges relative to the electromagnetic radiation source 101, starting with a first distance, and moving to one or more greater distances from the electromagnetic radiation source 101. In this way, an effective maximum effective range of the LDEW can be determined, that is, a range within which the light path to the target is not too contaminated. The processor 103 operates to generate a laser control signal on this basis, selectively enabling and disabling operation of the laser 201.

The processor 103 is generates a laser control signal based on characteristics of the detected backscattered radiation, including intensity of the detected backscattered radiation, as this is representative of the presence of contamination in the light path of the laser 201. The processor 103 is configured to generate a laser control signal for disabling operation of the laser 201 controlled by the laser controller 100 when the intensity of the detected backscattered radiation is above a cut-off threshold level, and conversely the processor 103 is configured to generate a laser control signal for enabling operation of the laser 201 controlled by the laser controller 100 when the intensity of the detected backscattered radiation is below the cut-off threshold level.

As well as enabling/disabling the laser 201 as described above, the processor 103 is further operable to generate a laser control signal that modulates the operational power of the laser 201 controlled by the laser controller 100, according to the intensity of the backscattered radiation. The processor 103 generates a laser control signal for increasing the operation power of the laser 201 controlled by the laser controller 100 above a default power when the intensity of the backscattered radiation is between a first modulation threshold and a second modulation threshold, so that an effective intensity is still delivered to a target despite some contamination in the light path.

Suitable optical arrangements are provided such that electromagnetic radiation source 101 transmits radiation in a direction aligned with the laser 201 of the LDEW 202, ideally along the same axis as the laser 201 of the LDEW. In another embodiment, the laser controller 100 is arranged to operate the laser 201 of the LDEW 202 as the electromagnetic energy source 101. Such embodiments do away with the requirement for a second laser source wen the laser controller 100 is used to control the laser of an LDEW.

Figure 3:
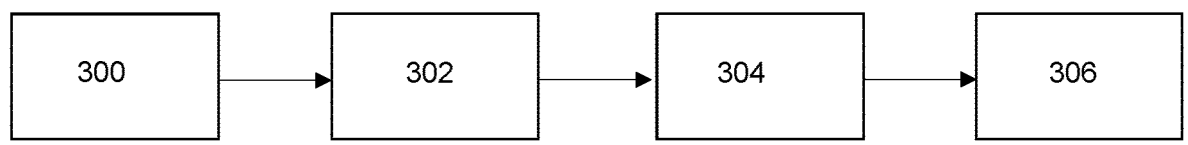
FIG. 3 depicts steps in a method according to an example embodiment.

FIG. 3 shows an example of a method of controlling a laser.

At step 300, an electromagnetic radiation source is operated to transmit radiation into an environment. At step 302, a backscattered detector is operated to detect backscattered radiation from the environment. At step 304, a laser control signal is generated based on characteristics of the backscattered radiation.

The method is performed by the laser controller, mounted to the vehicle.

The method further comprises controlling a laser of a LDEW using the laser control signal as step 306.

Steps 301 and 302 are conveniently performed using an electromagnetic radiation source and backscatter detector that comprise parts of a gas velocity sensor, such as a Doppler frequency shift sensor.

The method comprises operating the backscatter detector to detect backscattered radiation at a first distance range relative to the electromagnetic radiation source. In one example, the method comprises operating the backscatter detector to detect backscattered radiation within a plurality of different distance ranges relative to the electromagnetic radiation source, starting with a first distance, and moving to one or more greater distances from the electromagnetic radiation source. Thus, an effective maximum effective range of the LDEW can be determined, that is, a range within which the light path to the target is not too contaminated. Based on characteristics of the detected backscatter radiation, a laser control signal is generated, for selectively enabling and disabling operation of the laser.

The characteristics of the detected backscatter radiation include, for example, intensity of the detected backscattered radiation, as this is representative of the presence of contamination in the light path of the laser. A laser control signal for disabling operation of the laser controlled by the laser controller is generated when the intensity of the detected backscattered radiation is above a cut-off threshold level. Similarly, a laser control signal for enabling operation of a laser controlled by the laser controller is generated when the intensity of the detected backscattered radiation is below a cut-off threshold level.

As well as enabling/disabling the laser as described above, a laser control signal for modulating the operational power of a laser controlled by the laser controller according to the intensity of the backscattered radiation is generated. A laser control signal for increasing the operation power of a laser controlled by the laser controller above a default power is generated when the intensity of the backscattered radiation is between a first modulation threshold and a second modulation threshold, such that an effective intensity is still delivered to a target despite some contamination in the light path.

The method in one embodiment comprises operating the electromagnetic radiation source independently of a laser controlled by the laser control signal. In another embodiment, the method comprises operating the laser of an LDEW as the electromagnetic radiation source, eliminating the need for a second laser source, when the method is performed to control the laser of an LDEW.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A system comprising:
   a laser directed energy weapon (LDEW) comprising an LDEW laser controlled by an LDEW controller, the LDEW laser being configured to emit an LDEW laser beam in an LDEW beam direction;
   a gas velocity sensor (GVS) comprising:
      a GVS laser distinct from the LDEW laser and operable to transmit in the LDEW beam direction a GVS laser beam into an environment; and
      an interferometer operable to detect backscattered radiation resulting from interactions between the GVS laser beam and a gas that is impacted in the environment by the GVS laser beam, the interferometer being configured to detect both an intensity and a Doppler shift of the backscattered radiation, the gas velocity sensor being operable to determine a velocity of the gas relative to the gas velocity sensor according to the Doppler shifts of the backscattered radiation that are detected by the interferometer;
   wherein the LDEW controller is operable to receive data from the interferometer, and to control an output intensity of the LDEW laser according to the intensity of the backscattered radiation that is detected by the interferometer.

2. The system of claim 1, wherein the interferometer is operable to detect the backscattered radiation at a first distance relative to the GVS laser.

3. The system of claim 2, wherein the interferometer is operable to detect the backscattered radiation within a plurality of distance ranges from the GVS laser, starting with the first distance, and moving to one or more greater distances from the GVS laser.

4. The system of claim 1, wherein the LDEW controller is operable to selectively enable and disable operation of the LDEW laser.

5. The system of claim 4, wherein the LDEW controller is operable to disable operation of the LDEW laser when the intensity of the detected backscattered radiation is above a cut-off threshold level.

6. The LDEW system of claim 4, wherein the LDEW controller is operable to modulate an operational power of the LDEW laser according to the intensity of the detected backscattered radiation.

7. The system of claim 6, wherein the LDEW controller is operable to increase the operational power of the LDEW laser above a default power when the intensity of the detected backscattered radiation is between a first modulation threshold and a second modulation threshold.

8. A vehicle comprising the system of claim 1.

9. A method of controlling a laser comprising:
providing the system according to claim 1;
emitting by the GVS laser of the GVS laser beam;
detecting by the interferometer of the intensity of the backscattered radiation resulting from the interactions between the GVS laser beam and the gas that is impacted in the environment by the GVS laser beam; and
controlling of an operational power of the LDEW laser according to the intensity of the backscattered radiation as detected by the interferometer of the gas velocity sensor.

10. The method of claim 9, wherein:
the system is cooperative with a vehicle.

11. The system of claim 1, wherein the LDEW laser and the GVS laser are configured to transmit their respective laser beams along the same axis.

12. The vehicle of claim 8, wherein the vehicle is an aircraft.

13. The method of claim 10, wherein the vehicle is an aircraft.

* * * * *